(12) United States Patent  
Arulf et al.

(10) Patent No.: US 10,633,122 B2
(45) Date of Patent: Apr. 28, 2020

(54) JOINT AND CLAMP BAND SYSTEM FOR RELEASABLY CONNECTING SPACE CRAFT ELEMENTS

(71) Applicant: RUAG SPACE AB, Göteborg (SE)

(72) Inventors: Örjan Arulf, Linköping (SE); Johan Öhlin, Rimforsa (SE); Magnus Thenander, Linköping (SE)

(73) Assignee: RUAG SPACE AB, Göteborg (SE)

( * ) Notice: Subject to any disclaimer, the term of this patent is extended or adjusted under 35 U.S.C. 154(b) by 0 days.

(21) Appl. No.: 16/234,407

(22) Filed: Dec. 27, 2018

(65) Prior Publication Data

US 2019/0217973 A1    Jul. 18, 2019

Related U.S. Application Data

(63) Continuation of application No. PCT/SE2016/050672, filed on Jun. 30, 2016.

(51) Int. Cl.
*B64G 1/64*    (2006.01)
*F16B 2/08*    (2006.01)

(52) U.S. Cl.
CPC . *B64G 1/64* (2013.01); *F16B 2/08* (2013.01)

(58) Field of Classification Search
CPC ............ B64G 1/64; B64G 1/641; F16L 32/08
See application file for complete search history.

(56) References Cited

U.S. PATENT DOCUMENTS

| 4,715,565 | A | * | 12/1987 | Wittmann | ............... | B64G 1/641 |
| | | | | | | 102/377 |
| 5,352,061 | A | | 10/1994 | Robinson | | |
| 5,649,680 | A | | 7/1997 | Andersson | | |
| 6,076,467 | A | | 6/2000 | Cespedosa et al. | | |
| 6,290,182 | B1 | | 9/2001 | Grunditz | | |
| 6,401,958 | B1 | * | 6/2002 | Foss | .......................... | F16J 13/06 |
| | | | | | | 220/320 |

(Continued)

FOREIGN PATENT DOCUMENTS

| FR | 2 584 115 A1 | 1/1987 |
| JP | H04-87900 A | 3/1992 |
| JP | 2000-238700 A | 9/2000 |

OTHER PUBLICATIONS

International Search Report and Written Opinion for PCT/SE2016/050672, completed Mar. 24, 2017.

(Continued)

*Primary Examiner* — Valentina Xavier

(74) *Attorney, Agent, or Firm* — Brinks Gilson & Lione; John C. Freeman

(57) ABSTRACT

The disclosure concerns a joint (1) for releasably connecting a first space craft element (2) to a second space craft element (3) comprising a first flange (4) on the first space craft element (2) and a second flange (5) on the second space craft element (3). The joint (1) comprises first shoe portions (6) and second shoe portions (13) formed as sectors of a solid of revolution, keeping the flanges (4, 5) together in a longitudinal direction, The shoe portions are positioned next to each other in a circumferential direction the reference to a longitudinal direction of the space crafts. The first shoe portions being arranged to, at a prevailing Coulomb friction, not allow self-locking and the second show portions are arranged to allow self-locking.

20 Claims, 5 Drawing Sheets

(56) References Cited

U.S. PATENT DOCUMENTS

Figure 1B:
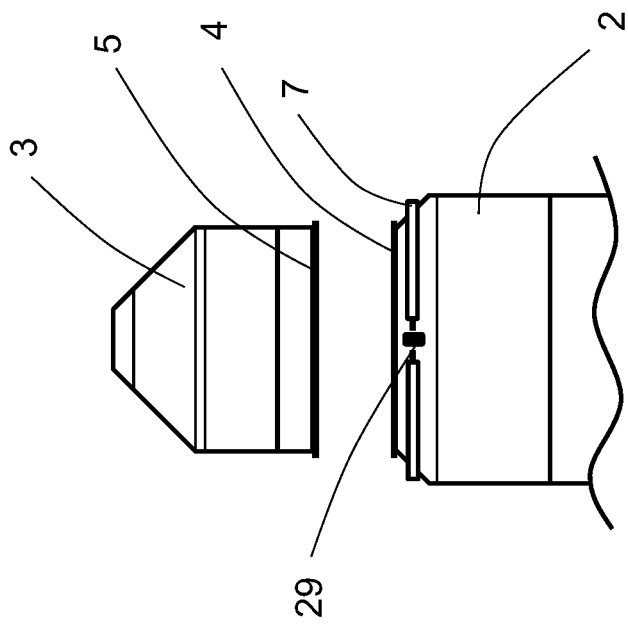

| | | | |
|---|---|---|---|
| 6,454,214 B1 | 9/2002 | Smith et al. | |
| 6,648,543 B2 * | 11/2003 | Arulf | B64G 1/641 |
| | | | 403/334 |
| 7,114,683 B2 * | 10/2006 | Hall | B64G 1/002 |
| | | | 244/173.1 |
| 10,190,537 B2 * | 1/2019 | Scarr | F16B 2/08 |
| 2013/0009012 A1 | 1/2013 | Kobayashi et al. | |
| 2014/0314476 A1 | 10/2014 | Tamiozzo | |

OTHER PUBLICATIONS

International Preliminary Report on Patentability for PCT/SE2016/050672, dated Jan. 1, 2019.

Supplementary European Search Report (eight pages) dated Jan. 22, 2020 from corresponding European Application No. EP 16 907 481.2.

* cited by examiner

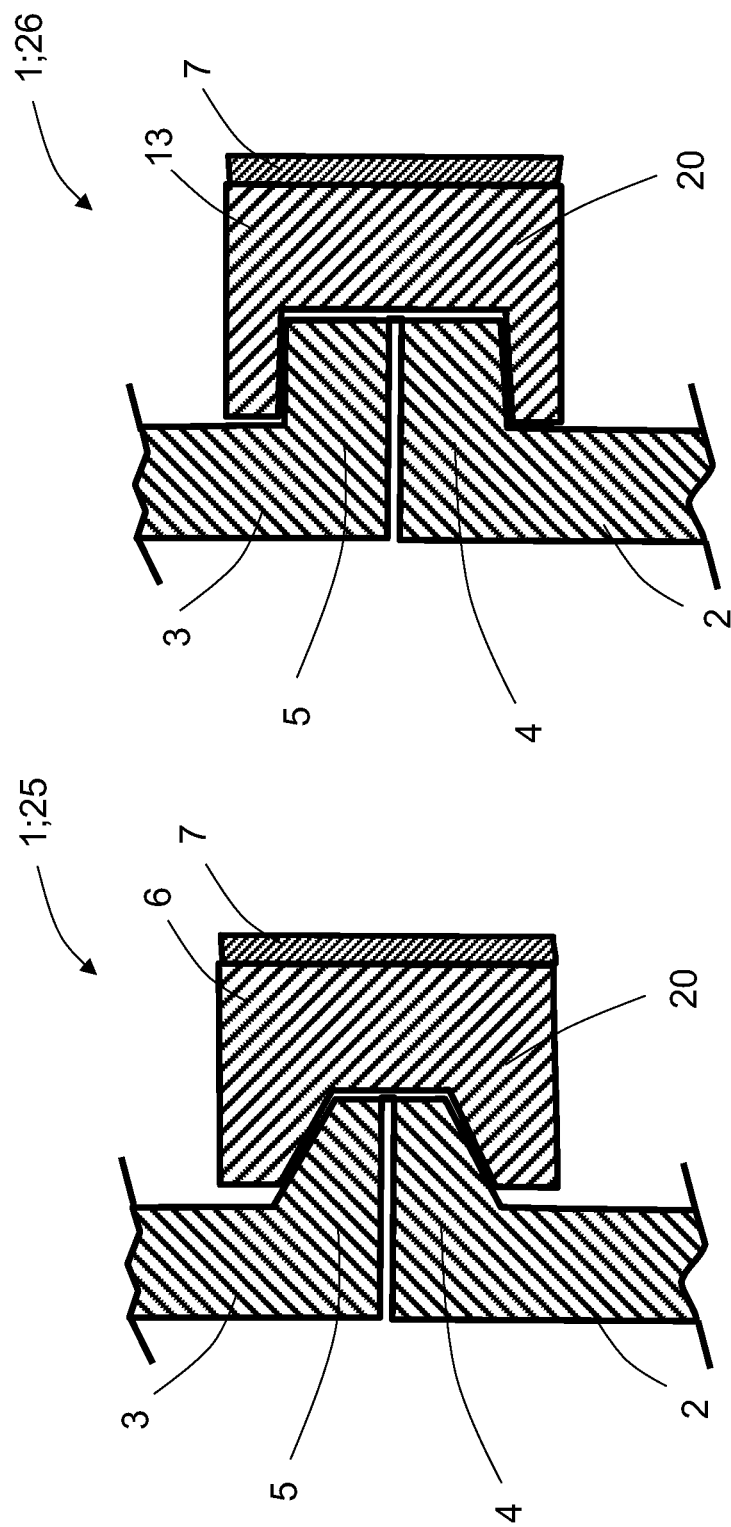

US 10,633,122 B2

JOINT AND CLAMP BAND SYSTEM FOR RELEASABLY CONNECTING SPACE CRAFT ELEMENTS

RELATED APPLICATIONS

This application is a continuation under 35 U.S.C. § 120 of U.S. Application No. PCT/SE2016/050672, filed Jun. 30, 2016, the content of which is incorporated herein by reference in its entirety.

TECHNICAL FIELD

The present disclosure relates to a joint for releasably connecting a first space craft element to a second space craft element, comprising a first flange on the first space craft element and a second flange on the second space craft element. The joint further comprises first shoe portions formed as sectors of a solid of revolution keeping the flanges together, and the first shoe portions are surrounded by a peripherally arranged, tensioning and releasing means acting in a radial direction. The first flange comprises first sectors having first flange surfaces sloping outwards, towards a reference plane being perpendicular to a longitudinal direction of the space craft elements, forming a first angle with the reference plane. The second flange comprises corresponding first sectors having second flange surfaces sloping outwards, towards the reference plane, forming a second angle with the reference plane. The first shoe portions are formed with a first lower surface of revolution corresponding to the first flange surfaces and a first upper surface of revolution corresponding to the second flange surfaces. The first and second angles are chosen so that with an increasing longitudinal force trying to separate the first and second flanges, at a prevailing Coulomb friction, self-locking cannot occur between the lower first surface and the first flange surfaces and between the upper first surface and the second flange surfaces.

BACKGROUND

In the field of space flight and space craft, one common operational phase is the separation of one space craft element from another space craft element, such as for example the separation of a satellite from a launch vehicle at a desired point in time. This may take place during flight when the space craft is on its way to an orbit or in the orbit. Typically, when the space craft includes a so called multi-stage rocket, there are a number of separation events until the satellite is eventually separated from the last launch vehicle stage or payload adapter. Each separation event is complex and introduces additional risk into the success of the launch mission. By way of example, separation events may occur when the payload separates prior to orbital insertion, or when used, a launch vehicle separates after the early phase of a launch. Hence, there are several different separation events during the journey to orbit or in the orbit.

In order to ensure a safe and controlled separation of two space craft elements, the space craft includes a separation system. The separation system may often include pyrotechnic fasteners or pneumatic systems to initiate the separation of the space craft elements. A separation system of a space craft should not only offer a safe separation of space craft elements, but also ensure that e.g. satellite and launch vehicles remain securely attached to one another during the tough journey into space.

U.S. Pat. No. 5,649,680 discloses one type of device for releasably connecting a first element and a second element of a space craft. A joint dismountably attaches a launcher to a satellite. The joint includes first and second flanges. The first flange is formed with at least one surface of revolution forming an angle with a contact plane between the flanges. The second flange is formed with another surface of revolution forming another angle with the contact plane between the flanges. Clamps/shoes are formed with a corresponding lower surface of revolution corresponding to the surface of revolution of the first flange, and with an upper surface of revolution corresponding to the surface of revolution of the second flange. The flanges are also prolonged with surfaces perpendicular to the main body of the first and second space craft elements respectively. The clamps/shoes further comprise surfaces perpendicular to the main body of the first space craft element and satellite corresponding to the flange surfaces perpendicular to the main body of the first and second space craft elements. The perpendicular surfaces are intended to take up peak loads occurring during flight trying to separate the first and second elements from each other, without having to put too high radial pressure from the tensioning means or compromising on the angle of the sloped surface risking self-locking. It should be noted that too high radial pressure from the tensioning means may cause damage on the body of the space craft elements. Furthermore, the prolonged flanges serve as a lever and during high load peaks the lever may cause unwanted bending loads on the main body of the first and second space craft elements Although this type of devices works well in some situations, there is still room for improvements.

SUMMARY

An object of the present disclosure is to provide a joint and clamp band system for releasably connecting space craft elements, where the previously mentioned problems are avoided. There is thus a need to find a solution to the above mentioned problem with a joint that secures two space craft elements with radial forces, but do not risk damaging the main body or fuselage of the first space craft element and satellite. At the same time the joint must have the ability to take up peak loads in the longitudinal direction trying to separate the first space craft element and satellite without compromising on the angle of the sloped surface risking self-locking. Furthermore, considering the demand for reasonable dimensions and weight there is a need for a joint that can take up high loads in relation to the geometrical dimensions. This object is at least partly achieved by the features of the independent claims. The dependent claims contain further developments of the joint and clamp band system.

As mentioned herein, the term "space craft element" can be any one of a satellite, launch vehicle, launch vehicle stage, payload, launch vehicle adapter, payload adapter, fairing a combination thereof and/or a plurality thereof."

The disclosure concerns a joint for releasably connecting a first space craft element to a second space craft element, comprising a first flange on the first space craft element and a second flange on the second space craft element. The joint comprises first shoe portions formed as sectors of a solid of revolution keeping the flanges together, which first shoe portions are surrounded by a peripherally arranged, tensioning and releasing means acting in a radial direction. The first flange comprises first sectors having first flange surfaces sloping outwards, towards a reference plane being perpendicular to a longitudinal direction of the space craft elements, forming a first angle with the reference plane. The second flange comprises corresponding first sectors having second flange surfaces sloping outwards, towards the reference plane, forming a second angle with the reference plane. The first shoe portions are formed with a first lower surface of revolution corresponding to the first flange surfaces and a first upper surface of revolution corresponding to the second flange surfaces. The first and second angles are chosen so that with an increasing longitudinal force trying to separate the first and second flanges, at a prevailing Coulomb friction, self-locking cannot occur between the first lower surface of revolution and the first flange surfaces and between the first upper surface of revolution and the second flange surfaces.

The longitudinal direction is a reference direction along a longitudinal axis. The longitudinal direction runs in the direction of flight of the space craft element when they are joint. The longitudinal direction can also be explained as the direction in which the space craft elements are assembled on top of each other. The direction perpendicular to the longitudinal direction is defined as the radial direction and the reference plane lies in the radial direction with the longitudinal direction as a normal to the plane.

According to one example, the contact plane between the flanges coincides with the reference plane. However, according to another example, the contact plane is arranged at an angle to the reference plane.

The joint also comprises second shoe portions formed as sectors of a solid of revolution, keeping the flanges together in a longitudinal direction, being perpendicular to the radial direction. The second shoe portions are surrounded by the peripherally arranged, radially acting tensioning and releasing means. The first flange comprises second sectors having third flange surfaces, forming a third angle with the reference plane. The second flange comprises corresponding second sectors having fourth flange surfaces, forming a fourth angle with the reference plane. The second shoe portions are formed with a second lower surface of revolution corresponding to the third flange surfaces and a second upper surface of revolution corresponding to the fourth flange surfaces, where the third angle and the fourth angle being zero degrees or being chosen so that with an increasing longitudinal force trying to separate the first and second flanges, at a prevailing Coulomb friction, self-locking will occur between the second lower surface of revolution and the third flange surface and between the second upper surface of revolution and the fourth flange surface. In the second sectors there is a first distance between the second lower surface of revolution and the third flange surface and a second distance between the second upper surface of revolution and the fourth flange surface upon contact between the first and second flanges in the contact plane.

The second shoe(s) has the ability and advantage to take up peak loads in the longitudinal direction trying to separate the first and second space craft elements. The joint can therefore take up high loads in relation to the geometrical dimensions. Peak loads are loads that occur very seldom, not even on every launch or flight. It might, for example, be caused by a non-foreseen jet stream during the flight.

Further advantages with the joint is that since the second shoe(s) has the ability to take up peak loads, the joint and the first shoes can be dimensioned for normal loads instead of peak loads. This in turn means that the joint secures the first and second space craft elements with radial forces that do not risk damaging the main body or fuselage of the first and second space craft elements or puts increased demands on the material dimensions on the space crafts and/or the clamp band system with increased weight as a consequence. Hence, the joint gives the advantage of weight saving.

According to an aspect of the disclosure, the first lower surface of revolution and the first upper surface of revolution in the first shoe portions are radially dimensioned and arranged so that with an increasing longitudinal force form-locking contact is obtained substantially simultaneously between the first lower surface of revolution and the first flange surfaces and the first upper surface of revolution and the second flange surfaces. An advantage with these features is that the first shoe portions are arranged to hold the first and second space craft element together in a secure way, where the forces are distributed evenly between the first lower surface of revolution and the first flange surfaces and the first upper surface of revolution and the second flange surfaces.

According to another aspect of the disclosure, the first shoe portion provides a constant pressure to the first and second flanges during connection. Advantages with this feature are that the forces are evenly distributed on the flanges during space flight and that the space craft elements can be designed to meet specific load requirements.

According to another aspect of the disclosure, the first shoe portions and the second shoe portions are positioned next to each other such that every second shoe portion being first shoe portions and second shoe portions respectively. An advantage with these features is that the forces can be evenly distributed around the body of the space craft where the joint is located.

According to another aspect of the disclosure, the first and second shoe portions are positioned within one shoe unit. An advantage with this feature is that only one type of shoe units can be used, which provides a simple construction that is fulfilling the requirement to take up peak loads in the longitudinal direction trying to separate the first and second space craft elements from each other. This arrangement also has the advantage that both the first and second shoe portions will be removed simultaneously.

According to another aspect of the disclosure, a second shoe portion is positioned within the center of the shoe unit. An advantage with this feature is that the second shoe portions can be symmetrically arranged in a simple way between first shoe portions, so that the joint can take up high loads in relation to the geometrical dimensions.

According to one aspect of the disclosure, second shoe portions are positioned on the edges of the shoe unit. An advantage with this feature is that the second shoe portions can be symmetrically arranged in a simple way on each side of a first shoe portion, so that the joint can take up high loads in relation to the geometrical dimensions.

According to one aspect of the disclosure, second shoe portions are positioned on the edges of the shoe unit and within the center of the shoe unit. An advantage with this feature is that the second shoe portions can be symmetrically arranged in a simple way so that the joint can take up high loads in relation to the geometrical dimensions The flanges normally follow the shape of the space craft elements for a simple and robust design. According to another aspect of the disclosure, the first and second flanges are substantially circular. An advantage with this feature is that the flanges are following the shape of the space craft elements for a simple and robust design. However, according to another aspect of the disclosure, the first and second flanges are substantially oval. Regardless of the shape of the flanges and the space craft, the first and second shoe portions are designed accordingly to follow the shape of the flanges.

The disclosure further concerns a clamp band system for releasably connecting a first space craft element to a second space craft element. The clamp band system comprises a tensioning and releasing means, first shoe portions and second shoe portions according to the above. As been explained above, the first shoe portions are formed with a first lower surface of revolution and a first upper surface of revolution, and the second shoe portions being formed with a second lower surface of revolution and a second upper surface of revolution. Advantages with these features are that the clamp band system can be dimensioned for normal loads and thus can secure the first and second space craft elements with radial forces that do not risk damaging the main body or fuselage of the first and second space craft elements, but at the same time with the ability to take up peak loads in the longitudinal direction trying to separate the first and second space craft elements.

According to another aspect of the disclosure, the first lower surface of revolution has a first angle and the first upper surface of revolution has a second angle, the second lower surface of revolution has a third angle and the second upper surface of revolution has a fourth angle, where the first angle and the second angle are larger than the third angle and the fourth angle, and where the angles are related to the reference plane. The different angles are design parameters that are dependent on friction and geometry. The angles in the first shoe portions and corresponding first sectors of the flanges, should be chosen to secure a safe release of the clamp band together with the shoe portions during the separation phase of the space craft elements. The angles in the second shoe portions and corresponding second sectors of the flanges, should be chosen to secure the space craft elements during peak loads. The first and second distances in the second shoe portions are design parameters dependent on how much separation of the space craft elements that can be allowed during peak loads and how well the second shoe portion(s) separate from the flanges during the separation phase of the space craft elements. It is imperative that both the first and second shoe portion(s) are removed from the flanges together with the tensioning and releasing means during the separation phase of the space craft elements. According to one example, the tensioning and releasing means are arranged to hold the first and second shoe portions in a holding structure. According to one example, the holding structure can be arranged to hold and secure the first and second shoe portions in a predetermined position. According to one example, the holding structure can be arranged to hold and secure the first and second shoe portions in a slidable arrangement in the tensioning and releasing means.

According to another aspect of the disclosure, the third angle and the fourth angle are both zero degrees. This feature essentially removes the friction parameter and gives a more pure form-locking between the flanges and the second shoe portion(s).

Here and in the entire application, form-locking means that the geometry itself hinder movement between two objects. In the disclosure it is also discussed self-locking which differ from form-locking by involving the friction parameter and a sloped/angled contact surface. When the first shoe portion applies radial pressure on the flanges, the angle divides the radial force into a radial force component and a longitudinal force component. The greater the angle, the lesser the longitudinal force component in the longitudinal direction, i.e. the force holding the flanges together. Hence, it is desirable to have as little angle as possible in order to get the most longitudinal force as possible in the locking phase of the joint. However, in the separation phase of the space craft elements, i.e. when the tensioning and releasing means are opened to enable removal of the clamp band assembly, there will be forces acting in the longitudinal direction from the space craft components themselves. The longitudinal forces will act on the sloped/angled surfaces and the angled/sloped surfaces will divide that force into longitudinal and radial forces. When the angle is correct, the radial force will push the first shoe portion away from the space craft elements and continue to do so when the space craft elements separate and move in the longitudinal direction. It can be described as the first shoe portion sliding along the slopes of the flanges. However, should the angle be too less, there is a risk that the friction between the flange and first shoe portion surfaces are greater than the radial force, which then hinders the first shoe portion from sliding on the slopes and thus hinders the first shoe portion from being pushed away from the space craft elements, which in turn hinders the separation of the space craft elements, hence self-locking. The second shoe portion either has zero degree angles with form locking or an angle that allows for self-locking and/or form locking.

It should be noted that the surfaces of the flanges and corresponding surfaces of the first and second shoes can have different surface shapes, for example, flat or convex.

BRIEF DESCRIPTION OF THE SEVERAL
VIEWS OF THE DRAWINGS

Figure 1A:
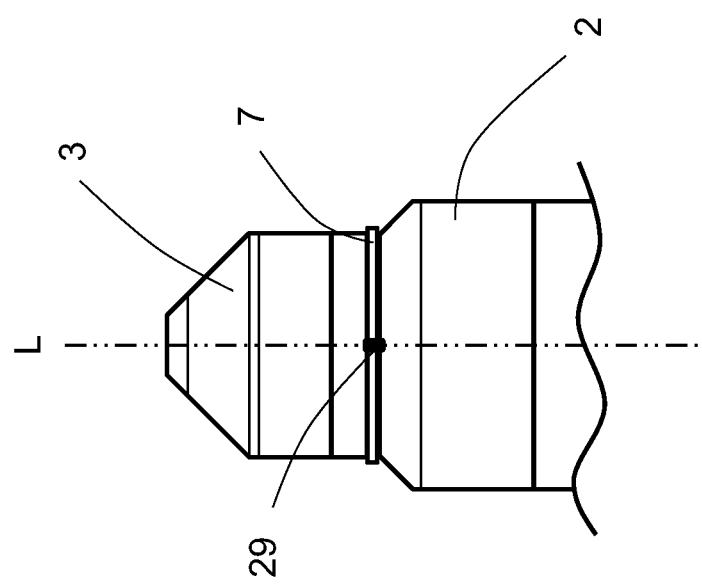
Figure 2:
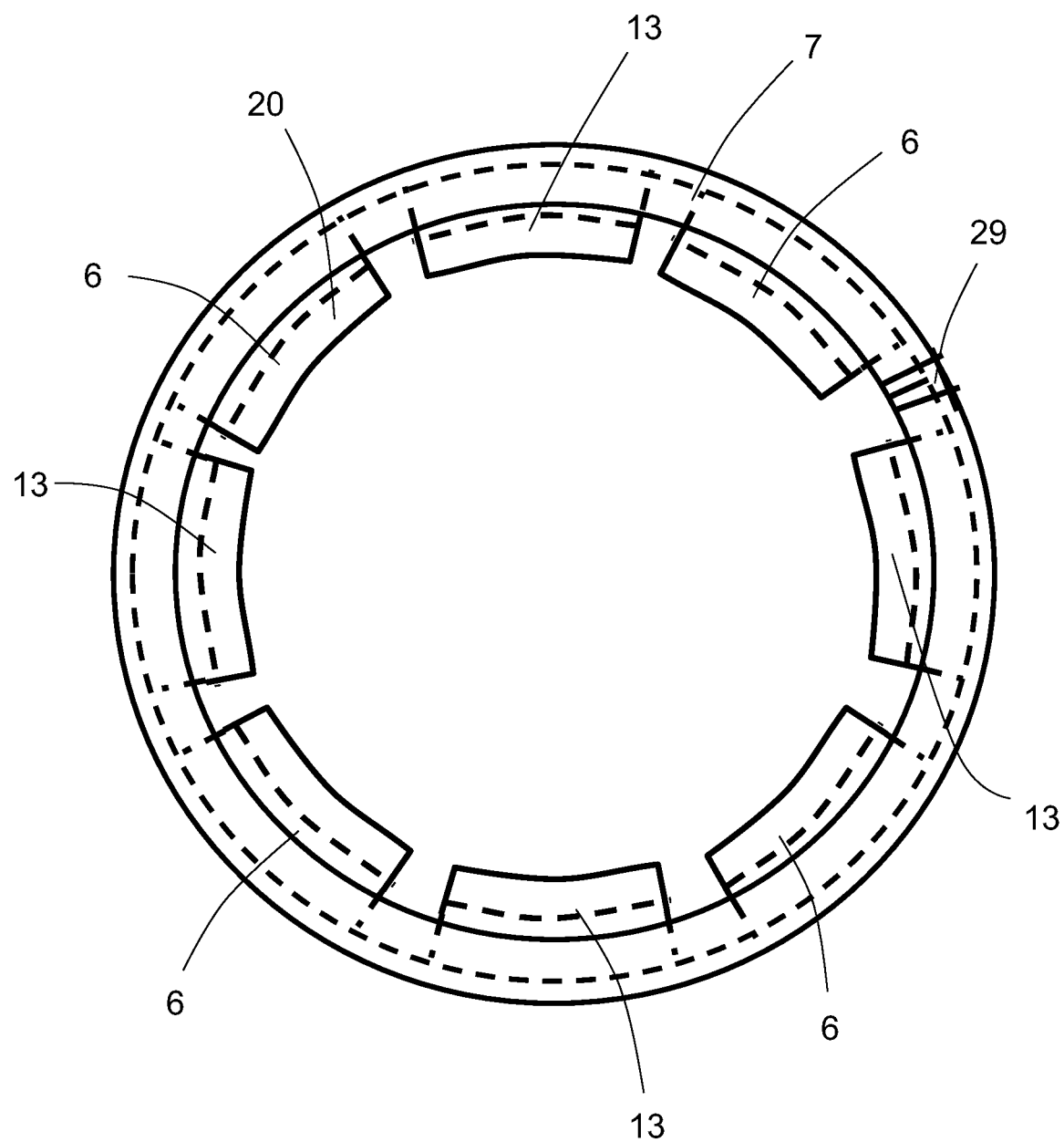
Figure 3:
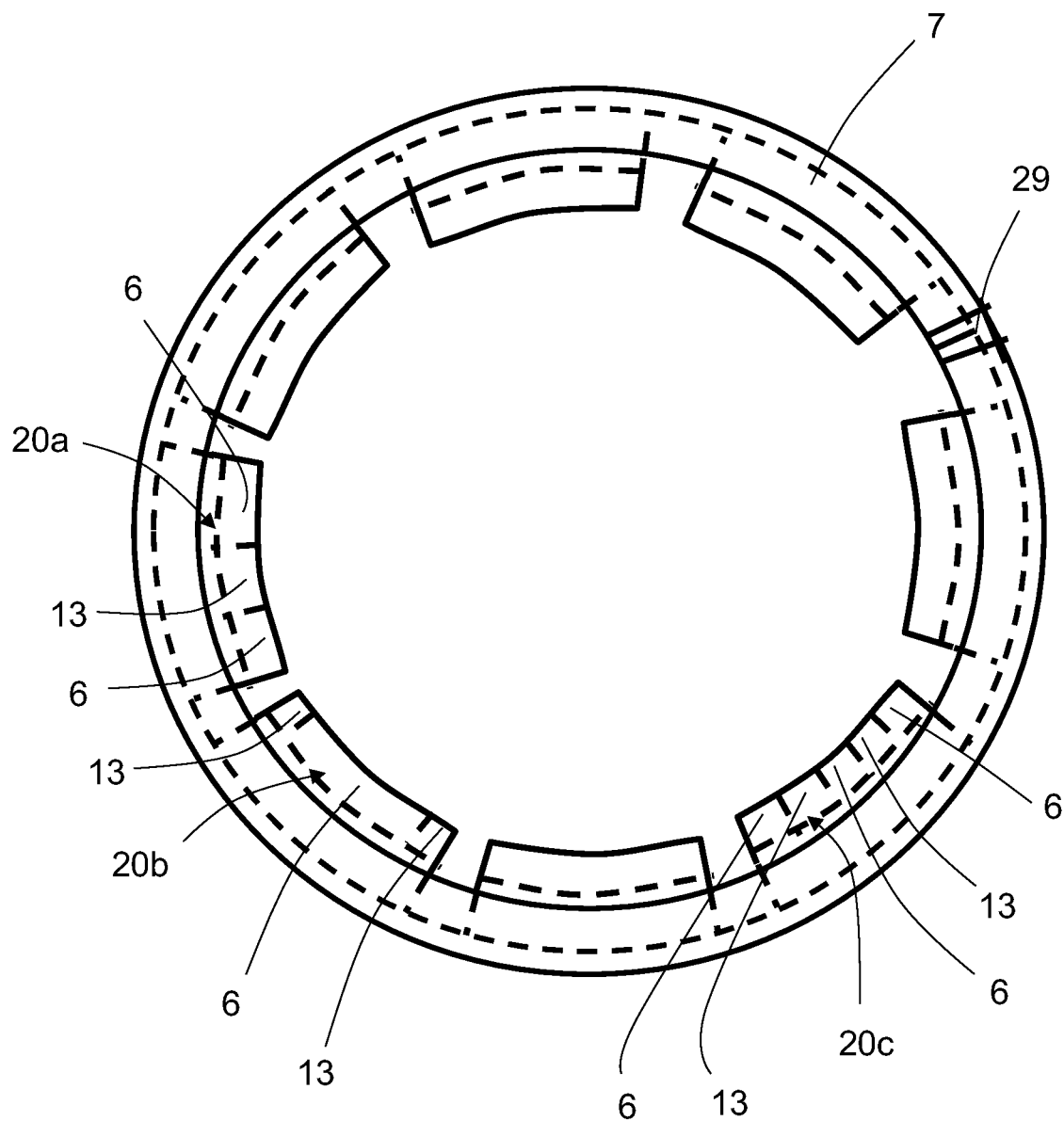
Figures 4A, 4B:
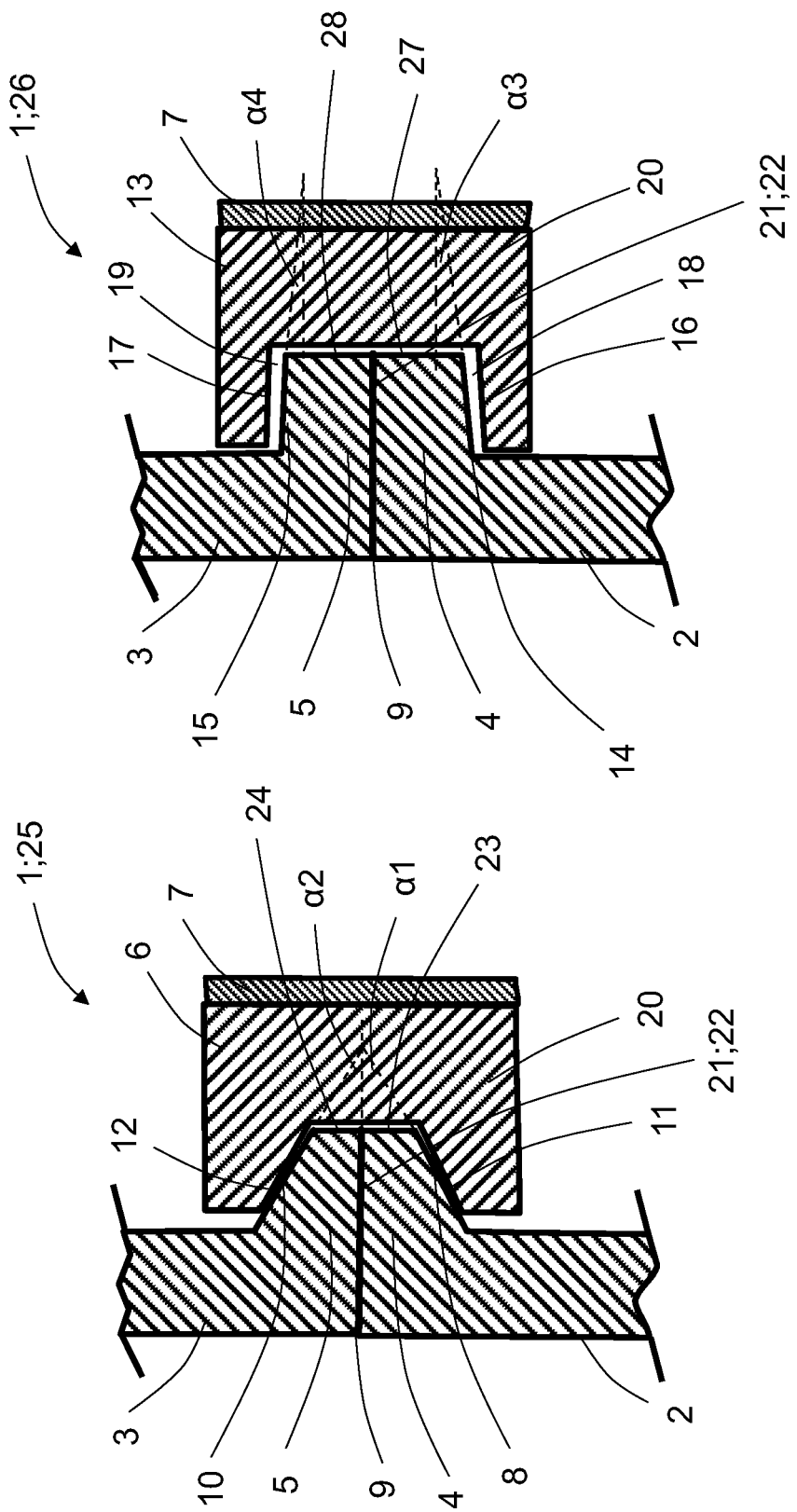

The disclosure is described in the following with reference to a number of drawings, in which:

FIG. 1A schematically shows a joint between two space craft elements during attachment of the space craft elements to each other via the joint, according to the disclosure;

FIG. 1B schematically shows a joint between two space craft elements during separation of the space craft elements, according to the disclosure;

FIG. 2 schematically shows a top view of a clamp band system with the shoe portions being positioned next to each other such that every second shoe portion being a first and second shoe respectively, according to the disclosure;

FIG. 3 schematically shows a top view of a clamp band system and shoe units, where the first and second shoe portions are positioned within one shoe unit, according to the disclosure;

FIGS. 4A and 4B schematically show cross-sections through portions of a joint under a normal longitudinal load conditions, according to the disclosure; and FIGS. 5A and 5B schematically show cross-sections through portions of a joint under peak longitudinal load conditions, according to the disclosure.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

FIGS. 1A and 1B schematically show a joint 1 between a first space craft element 2 and a second space craft element 3 during attachment and separation of the spacecraft elements in relation to each other. One common operational phase during space flight is the separation of one space craft element from another space craft element, such as for example the separation of a satellite from a launch vehicle at a desired point in time. This may take place during flight and typically, when the space craft includes a so called multi-stage rocket, there are a number of separation events until the satellite is eventually separated from the last launch vehicle. Each separation event is complex and introduces additional risk into the success of the launch mission. In order to ensure a safe and controlled separation of the two space craft elements, such as a separation between a launch vehicle and the satellite, the space craft includes a separation system comprising the joint 1. The joint 1 secures a safe separation of the space craft elements and also ensures that the space craft elements are securely attached to each other during the space flight.

The joint 1 comprises a first flange 4 arranged on the first space craft element 2 and a second flange 5 arranged on the second space craft element 3, as shown in FIGS. 4A and 4B. The joint 1 further comprises a number of shoe units 20 that are interacting with the first and second flanges to releasably keep the first and second space craft elements together via the first and second flanges 4, 5. The shoe units 20 are surrounded by a tensioning and releasing means 7. During flight, the tensioning and releasing means 7 is designed to keep the first space craft element 2 and the second space craft element 3 together until it is time to separate the elements from each other. When separating the elements, the tensioning and releasing means 7 together with the shoe units 20 is separated from the space craft so that the first space craft element 2 and the second space craft element 3 can be disconnected from each other. The separation system may include pyrotechnic fasteners or pneumatic systems to initiate the separation of the space craft elements. The tensioning and releasing means 7 is together with the shoe units 20 forming a clamp band system for releasably connecting the first space craft element 2 to the second space craft element 3.

As seen in FIGS. 1A and 1B, the first space craft element 2 and the second space craft element 3 have elongated shapes extending in a longitudinal direction along a longitudinal axis L. The direction perpendicular to the longitudinal direction is defined as the radial direction. In order to facilitate the description of the invention it has been introduced a reference plane 9 being perpendicular to the longitudinal direction L of the space craft elements 2, 3. In the drawings, the contact plane 9' between the flanges coincides with the reference plane 9. However, according to another example (not shown) the contact plane is arranged at an angle to the reference plane.

The first space craft element 2 and the second space craft element 3 may be symmetrically shaped around an axis of symmetry stretching in the longitudinal direction, i.e. the first and second space craft elements may have circular shapes when viewed from above. However, other shapes are possible, for example the first and second space craft elements may have oval shapes when viewed from above, or any other suitable shape. The first flange 4 is arranged on the upper end of the first space craft element 2 and the second flange 5 is arranged on the lower end of second space craft element 3. Both the first and second flanges may have substantially circular shapes extending along the periphery and projecting radially outwards from the respective first and second space craft elements. However, other shapes such as oval are possible. When the first space craft element 2 and the second space craft element 3 are connected to each other, the contact surface between the upper end of the first space craft element 2 and the lower end of the second space craft element 3 defines the contact plane 9', involving an upper end surface 21 of the first flange 4 and a lower end surface 22 of the second flange 5 as seen in FIGS. 4A and 4B.

The first flange 4 is divided into first sectors 25, shown in FIG. 4A, and second sectors 26, shown in FIG. 4B, along the periphery of the first space craft element 2, where the first and second sectors have different shape configurations. The first and second sectors are alternated along the periphery of the first space craft element 2 and the number of first and second sectors may be varied depending on the design of the first flange 4. The second flange 5 is in the same way divided into first sectors 25, shown in FIG. 4A, and second sectors 26, shown in FIG. 4B, along the periphery of the second space craft element 3, where the first and second sectors have different shape configurations. The number of first and second sectors of the second flange 5 corresponds to the number of first and second sectors of the first flange 4 and are alternated in the same way so that the first sectors 25 of the first flange 4 are matching the first sectors 25 of the second flange 5 along the periphery of the respective space craft elements, and the second sectors 26 of the first flange 4 are matching the second sectors 26 of the second flange 5 along the periphery of the respective space craft elements. The first sectors have thus the same extension in a direction along the periphery of the respective first and second flanges, and the second sectors have the same extension is a direction along the periphery of the respective first and second flanges.

When the first space craft element 2 is connected to the second space craft element 3, the first sectors 25 of the first flange 4 and the first sectors of the second flange 5 are located in the same position along the periphery of the flanges. In the same way, the second sectors 26 of the first flange 4 and the second sectors of the second flange 5 are located in the same position along the periphery of the flanges. The extension along the periphery of the flanges 4, 5 of the first and second sectors may be varied depending on the design. The extension of the first sectors 25 may be the same as the extension of the second sectors 26, and alternatively the extension may not be the same.

The first sectors 25 of the first flange 4 are provided with first outer end surfaces 23 extending in the longitudinal direction. The first outer end surfaces 23 may be essentially parallel to the longitudinal axis L or slightly inclined in relation to the longitudinal axis L. The first sectors 25 of the first flange 4 also comprises downwards facing first flange surfaces 8, which are extending along the periphery as surfaces of revolution of the first flange 4 and sloping radially outwards from the side wall of the first space craft element 2, towards the reference plane 9 between the flanges. The first flange surfaces 8 are forming a first angle $\alpha 1$ with the reference plane 9. The angle $\alpha 1$ may be varied depending on the design of the first flange 4.

The first sectors 25 of the second flange 5 are provided with second outer end surfaces 24 extending in the longitudinal direction. The second outer end surfaces 24 may be essentially parallel to the longitudinal axis L or slightly inclined in relation to the longitudinal axis L. The first sectors 25 of the second flange 5 also comprises upwards facing second flange surfaces 10, which are extending along the periphery as surfaces of revolution of the second flange 5 and sloping radially outwards from the side wall of the second space craft element 3, towards the reference plane 9 between the flanges. The second flange surfaces 10 are forming a second angle $\alpha 2$ with the reference plane 9. The angle $\alpha 2$ may be varied depending on the design of the second flange 5.

The second sectors 26 of the first flange 4 are provided with third outer end surfaces 27 extending in the longitudinal direction. The third outer end surfaces 27 may be essentially parallel to the longitudinal axis L or slightly inclined in relation to the longitudinal axis L. The second sectors 26 of the first flange 4 also comprises downwards facing third flange surfaces 14, which are extending along the periphery as surfaces of revolution of the first flange 4 and extending radially outwards from the side wall of the first space craft element 2. The third flange surfaces 14 may be parallel to the radial direction or may be slightly sloping radially towards the reference plane 9 between the flanges. The third flange surfaces 14 are forming a third angle α3 with the reference plane 9. The angle α3 may be varied depending on the design of the first flange 4 and when the third flange surfaces 14 are parallel to the radial direction the angle α3 is zero degrees.

The second sectors 26 of the second flange 5 are provided with fourth outer end surfaces 28 extending in the longitudinal direction. The fourth outer end surfaces 28 may be essentially parallel to the longitudinal axis L or slightly inclined in relation to the longitudinal axis L. The second sectors 26 of the second flange 5 also comprises upwards facing fourth flange surfaces 15, which are extending along the periphery as surfaces of revolution of the second flange 5 and extending radially outwards from the side wall of the second space craft element 3. The fourth flange surfaces 15 may be parallel to the radial direction or may be slightly sloping radially towards the reference plane 9 between the flanges. The fourth flange surfaces 15 are forming a fourth angle α4 with the reference plane 9. The angle α4 may be varied depending on the design of the second flange 5 and when the fourth flange surfaces 15 are parallel to the radial direction the angle α4 is zero degrees.

In a first embodiment according to the disclosure, the joint 1 comprises shoe units 20 of two different types as shown in FIG. 2. The first type of shoe units 20 are interacting with the first sectors 25 of the first and second flanges, and the second type of shoe units 20 are interacting with the second sectors 26 of the first and second flanges. The shoe units 20 are arranged to releasably keep the first and second space craft elements together via the first and second flanges. The first and second types of shoe units 20 are surrounded by the tensioning and releasing means 7. The tensioning and releasing means 7 is together with the first and second types of shoe units 20 forming a clamp band system for releasably connecting the first space craft element 2 to the second space craft element 3.

The first type of shoe units 20, which are interacting with the first sectors 25 of the first and second flanges comprise first shoe portions 6 formed as sectors of a solid of revolution that are keeping the first flange 4 and the second flange 5 together when the first space craft element 2 and the second space craft element 3 are connected to each other. The first shoe portions 6 are formed with a first lower surface of revolution 11 that is corresponding to and interacting with the first flange surfaces 8 of the first flange 4 and a first upper surface of revolution 12 corresponding to and interacting with the second flange surfaces 10 of the second flange 5. The first lower surface of revolution 11 is forming the same first angle α1 with the reference plane 9 as the first flange surfaces 8, and the first upper surface of revolution 12 is forming the same second angle α2 with the reference plane 9 as the second flange surfaces 10 when engaged with the first and second flanges 4, 5 during use.

The first type of shoe units 20 with first shoe portions 6 are interacting with the first sectors 25 of the first and second flanges through the tensioning and releasing means 7 which is exerting a radial force on the first shoe portions inwards towards the first and second flanges. The force exerted by the tensioning and releasing means is chosen so that a secure connection is achieved between the first space craft element 2 and the second space craft element 3, without damaging the respective space craft elements. The first angle α1 and the second angle α2 are chosen so that with an increasing longitudinal force trying to separate the first and second flanges, at a prevailing Coulomb friction, self-locking cannot occur between the first lower surface of revolution 11 and the first flange surfaces 8 and between the first upper surface of revolution 12 and the second flange surfaces 10. The first angle α1 and the second angle α2 may be chosen so that both angles have the same value or alternatively the angles may have different values.

The first lower surface of revolution 11 and the first upper surface of revolution 12 in the first shoe portions 6 are radially dimensioned and arranged so that with an increasing longitudinal force form-locking contact is obtained substantially simultaneously between the first lower surface of revolution 11 and the first flange surfaces 8 and the first upper surface of revolution 12 and the second flange surfaces 10. The first shoe portion 6 is designed to provide a constant pressure to the first and second flanges during connection.

The second type of shoe units 20, which are interacting with the second sectors 26 of the first and second flanges comprise second shoe portions 13 formed as sectors of a solid of revolution that are keeping the first flange 4 and the second flange 5 together in a longitudinal direction when the first space craft element 2 and the second space craft element 3 are connected to each other. The second shoe portions 13 are formed with a second lower surface of revolution 16 that is corresponding to the third flange surfaces 14 of the first flange 4 and a second upper surface of revolution 17 corresponding to the fourth flange surfaces 15 of the second flange 5. According to one example, the second lower surface of revolution 16 form the same third angle α3 with the reference plane 9 as the third flange surfaces 14, and the second upper surface of revolution 17 form the same second angle α4 with the reference plane 9 as the fourth flange surfaces 15 when engaged with the first and second flanges 4, 5 during use. According to another example, the second lower surface of revolution 16 does not form the same third angle α3 with the reference plane 9 as the third flange surfaces 14, and the second upper surface of revolution 17 does not form the same second angle α4 with the reference plane 9 as the fourth flange surfaces 15. Common for both examples above is that the second shoe portions 13 are arranged to lock the flanges when longitudinal peak load forces are exerted on the space craft.

During space flight normal load force variations are exerted on the space craft and in normal conditions the first type of shoe units can hold the first space craft element 2 and the second space craft element 3 together with the radial forces from the tensioning and releasing means 7 via the first type of shoe units 20 with first shoe portions 6. Sometimes during flights, peak load forces are exerted on the space craft that are higher or much higher than the normal load force variations. If these peak load forces are impacting the space craft in the longitudinal direction, separation between the first space craft element 2 and the second space craft element 3 may occur. The second type of shoe units 20 with second shoe portions 13 thus secure that the first space craft element 2 and the second space craft element 3 are not disengaged from each other even if a separation occurs in the longitudinal direction.

The second type of shoe units 20 with second shoe portions 13 are interacting with the second sectors 26 of the first and second flanges through the tensioning and releasing means 7 which is exerting a radial force on the second shoe portions inwards towards the first and second flanges. When the first space craft element 2 is connected to the second space craft element 3, there is in the second sectors 26 a first distance 18 between the second lower surface of revolution 16 and the third flange surface 14 and a second distance 19 between the second upper surface of revolution 17 and the fourth flange surface 15 upon contact between the first and second flanges in the contact plane 9'. This means that under normal flight conditions when the first space craft element 2 is connected to the second space craft element 3, the second lower surface of revolution 16 and the third flange surface 14 are not interacting with each other, and the second upper surface of revolution 17 and the fourth flange surface 15 are not interacting with each other. As described above, the purpose with the second type of shoe units 20 is to secure that the first space craft element 2 is securely connected to the second space craft element 3 even when high forces during flight are separating the space craft elements from each other in the longitudinal direction, as shown in FIGS. 5A and 5B. The third angle $\alpha 3$ and the fourth angle $\alpha 4$ are either zero degrees or being chosen so that with an increasing longitudinal force trying to separate the first and second flanges, at a prevailing Coulomb friction, self-locking will occur between the second lower surface of revolution 16 and the third flange surface 14 and between the second upper surface of revolution 17 and the fourth flange surface 15. The third angle $\alpha 3$ and the fourth angle $\alpha 4$ may be chosen so that both angles have the same value or alternatively the angles may have different values.

According to the disclosure, the first angle $\alpha 1$ and the second angle $\alpha 2$ may be larger than the third angle $\alpha 3$ and the fourth angle $\alpha 4$ in order to achieve the desired holding effect of the first and second space craft elements.

In the first embodiment, as shown in FIG. 2, the first and second types of shoe units 20 are arranged so that the first type of shoe units 20 and the second type of shoe units 20 are positions next to each other so that every second shoe unit 20 is of the first type and the second type respectively. In this way, the first shoe portions 6 and the second shoe portions 13 are positioned next to each other such that every second shoe portion being first shoe portions 6 and second shoe portions 13 respectively. As seen in FIG. 2, there are in total eight shoe units 20 symmetrically arranged around the periphery of the clamp band system, where four of them are of the first type with first shoe portions 6 and four of them are of the second type with second shoe portions 13. The number of shoe units 20 can be varied depending on the design and as an alternative they can be arranged in a way so that every second shoe unit is not of the same type. The extension of the first and second types of shoe units 20 in a direction along the tensioning and releasing means 7 can be varied depending on the design of the joint 1. In an alternative design, the extension along the tensioning and releasing means 7 of the second type of shoe units 20 with shoe portions 13 is small in relation to the extension of the first type of shoe units 20 with first shoe portions 6.

In a second embodiment according to the disclosure, the joint 1 comprises a third type of shoe unit 20 comprising both the first shoe portion 6 and the second shoe portion 13, which is shown in FIG. 3. In FIG. 3, alternative configurations of the third type of shoe units 20 are shown.

The third type of shoe units 20 are thus interacting with both the first sectors 25 of the first and second flanges and the second sectors 26 of the first and second flanges. The design of the first and second flanges may be varied so that the first and second sectors will interact with the shoe unit 20 in this way. The shoe units 20 are arranged to releasably keep the first and second space craft elements together via the first and second flanges. The shoe units 20 are surrounded by the tensioning and releasing means 7 and the tensioning and releasing means 7 is together with the shoe units 20 forming a clamp band system for releasably connecting the first space craft element 2 to the second space craft element 3.

In order for the shoe units 20 to interact with both the first and second sectors of the first and second flanges, the first and second shoe portions 6, 13 are positioned within one shoe unit. The first and second shoe portions 6, 13 are having configurations and characteristics as described above in conjunction with the first embodiment, with cross-sections schematically shown in FIGS. 4A and 4B.

The number of first and second shoe portions 6, 13 for each shoe unit 20 can be varied depending on the design of the joint. In FIG. 3, there are in total eight shoe units 20 symmetrically arranged around the periphery of the clamp band system, where all shoe units are of the same type with both first and second shoe portions 6, 13. The number of shoe units 20 can be varied depending on the design of the joint 1. In the embodiment shown in FIG. 3, a first example describes shoe units 20a, where each of the shoe units 20a has two sectors including the first shoe portions 6 and one sector including the second shoe portions 13, where the second shoe portions 13 are positioned within the center of each of the shoe units 20a. The extension of the first and second shoe portions 6, 13 in a direction along the tensioning and releasing means 7 can be varied to meet the specific design needs of a certain space craft. The first and second sectors of the first and second flanges 4, 5 are arranged to match the first and second shoe portions 6, 13.

In FIG. 3 an alternative design of the third type of shoe units 20 is shown, where each of the shoe units 20b has two sectors including the second shoe portions 13 and one sector including the first shoe portions 6, where the first shoe portions 6 are positioned within the center of each of the shoe units 20b. The extension of the first and second shoe portions 6, 13 in a direction along the tensioning and releasing means 7 can be varied depending on the design of the joint 1, and in this alternative design the extension of the second shoe portions 13 is small in relation to the extension of the first shoe portions 6. The first and second sectors of the first and second flanges 4, 5 are arranged to match the first and second shoe portions 6, 13.

In FIG. 3 another alternative design of the third type of shoe units 20 is shown, where each of the shoe units 20c has three sectors including the first shoe portions 6 and two sectors including the second shoe portions 13, where the first shoe portions 6 are positioned at the edges of and within the center of each of the shoe units 20c, and where the second shoe portions 13 are placed in between the first shoe portions 6. The extension of the first and second shoe portions 6, 13 in a direction along the tensioning and releasing means 7 can be varied depending on the design of the joint 1. The first and second sectors of the first and second flanges 4, 5 are arranged to match the first and second shoe portions 6, 13.

As seen from the examples described above, the number of first and second shoe portions 6, 13 as well as the first and second sectors of the first and second flanges 4, 5 can be varied depending on the needs, and also be arranged in different ways. Further arrangements and variations beyond the examples described above are possible within the scope of this disclosure, such as for example to mix shoe units 20 having first and second shoe portions 6, 13 in different configurations. Hence, it is possible to mix shoe units of the first, second and third type.

The purpose with the second shoe portions 13 is to secure that the first space craft element 2 is securely connected to the second space craft element 3 even when high peak load forces, exceeding normal load forces during flight, are trying to separate the space craft elements from each other in the longitudinal direction, as shown in FIGS. 5A and 5B. In normal flight conditions, the first shoe portions 6 can hold the first space craft element 2 and the second space craft element 3 together with the radial forces from the tensioning and releasing means 7. The second shoe portions 13 secure that the first space craft element 2 and the second space craft element 3 are not disengaged from each other even if a separation occurs in the longitudinal direction, when peak load forces are exerted on the space craft that are higher or much higher than the normal load force variations in the longitudinal direction.

The tensioning and releasing means 7 is surrounding the shoe units 20, as best seen in FIGS. 2 and 3B, and are exerting a radial force on the first and second flanges 4,5 via the first shoe portions 6 when the first space craft element 2 and the second space craft element 3 are connected. The tensioning and releasing means 7 has the form of a band or strap, which is kept tense by a tensioning and releasing unit 29. The band or strap may be made of a flexible material with a first end and a second end that may be brought together to encircle the shoe units 20 or the band may be made of two or more connected parts that together encircle the shoe units 20. The tensioning and releasing unit 29 is arranged to keep the band or strap under a predetermined pressure and also release the first space craft element 2 from the second space craft element 3 when the space craft has reached a predetermined altitude and track. The tensioning and releasing unit 29 comprises a locking mechanism that keeps the band under a predetermined pressure. The locking mechanism is arranged to release the pressure and open up such that the tensioning and releasing unit 29 separate from the space craft elements 2, 3 when the space craft elements 2, 3, are to be separated. The tensioning and releasing unit 29 is further arranged to be connected to the shoe portions and units such that the shoe portions and units are removed from the flanges together with the tensioning and releasing unit 29. The tensioning and releasing means 7 form a part of the clamp band system together with the shoe units 20. The tensioning and releasing means 7 is surrounding the shoe units 20 with first shoe portions 6 and second shoe portions 13. As described above, the first shoe portions 6 are formed with a first lower surface of revolution 11 and a first upper surface of revolution 12, and the second shoe portions 13 being formed with a second lower surface of revolution 16 and a second upper surface of revolution 17. The first lower surface of revolution 11 has a first angle α1 and the first upper surface of revolution 12 has a second angle α2, the second lower surface of revolution 16 has a third angle α3 and the second upper surface of revolution 17 has a fourth angle α4, where the angles α1-α4 are related to a plane that is corresponding to the reference plane 9 during use of the clamp band system, where the clamp band system is engaged with the first and second flanges 4, 5. The first angle α1 and the second angle α2 may be arranged so that they are larger than the third angle α3 and the fourth angle α4. In one example, the third angle α3 and the fourth angle α4 are both zero degrees.

When tightened, the tensioning and releasing means 7 exerts pressure on the shoe units 20 to hold the shoe units in place, to aid in holding the first space craft element 2 and the second space craft element 3 together, and when the tension is released by the tensioning and releasing unit 29, the first and second space craft elements may be disconnected. The clamp band system is not limited to encircling devices but also encompasses elliptical devices and a clamp ring where the band and shoes constitute one piece.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Joint
2: First space craft element
3: Second space craft element
4: First flange
5: Second flange
6: First shoe portions
7: Tensioning and releasing means
8: First flange surfaces
9: Reference plane 9 and contact plane 9'
10: Second flange surfaces
11: First lower surface of revolution
12: First upper surface of revolution
13: Second shoe portions
14: Third flange surfaces
15: Fourth flange surfaces
16: Second lower surface of revolution
17: Second upper surface of revolution
18: First distance
19: Second distance
20: Shoe unit
21: Upper end surface
22: Lower end surface
23: First outer end surfaces
24: Second outer end surfaces
25: First sectors
26: Second sectors
27: Third outer end surfaces
28: Fourth outer end surfaces
29: Tensioning and releasing unit

The invention claimed is:

1. A joint for releasably connecting a first space craft element to a second space craft element, comprising a first flange on the first space craft element and a second flange on the second space craft element, which joint comprises first shoe portions formed as sectors of a solid of revolution keeping the flanges together, which first shoe portions are surrounded by a peripherally arranged, tensioning and releasing means acting in a radial direction, the first flange comprising first sectors having first flange surfaces sloping outwards, towards a reference plane being perpendicular to a longitudinal direction of the space craft elements, forming a first angle with the reference plane, the second flange comprising corresponding first sectors having second flange surfaces sloping outwards, towards the reference plane, forming a second angle with the reference plane, the first shoe portions being formed with a first lower surface of revolution corresponding to the first flange surfaces and a first upper surface of revolution corresponding to the second flange surfaces, the first and second angles and being so chosen that with an increasing longitudinal force trying to separate the first and second flanges, at a prevailing Coulomb friction, self-locking cannot occur between the first lower surface of revolution and the first flange surfaces and between the first upper surface of revolution and the second flange surfaces;

characterized in that the joint comprises second shoe portions formed as sectors of a solid of revolution, keeping the flanges, together in a longitudinal direction, being perpendicular to the radial direction, which second shoe portions are surrounded by the peripherally arranged, radially acting tensioning and releasing means, the first flange comprising second sectors having third flange surfaces, forming a third angle with the reference plane, the second flange comprising corresponding second sectors having fourth flange surfaces, forming a fourth angle with the reference plane, the second shoe portions being formed with a second lower surface of revolution corresponding to the third flange surfaces and a second upper surface of revolution corresponding to the fourth flange surfaces, where the third angle and the fourth angle being zero degrees or being chosen so that with an increasing longitudinal force trying to separate the first and second flanges, at a prevailing Coulomb friction, self-locking will occur between the second lower surface of revolution and the third flange surface and between the second upper surface of revolution and the fourth flange surface, wherein in the second sectors there is a first distance between the second lower surface of revolution and the third flange surface and a second distance between the second upper surface of revolution and the fourth flange surface upon contact between the first and second flanges in the contact plane.

2. A joint according to claim 1, characterized in that the first lower surface of revolution and the first upper surface of revolution in the first shoe portions are radially dimensioned and arranged so that with an increasing longitudinal force form-locking contact is obtained substantially simultaneously between the first lower surface of revolution and the first flange surfaces and the first upper surface of revolution and the second flange surfaces.

3. Joint according to any one of claim 1, characterized in that the first shoe portion provides a constant pressure to the first and second flanges during connection.

4. A joint according to claim 1, characterized in that the first shoe portions and the second shoe portions are positioned next to each other such that every second shoe portion being first shoe portions and second shoe portions respectively.

5. A joint according to claim 1, characterized in that the first and second shoe portions are positioned within one shoe unit.

6. A joint according to claim 5, characterized in that the second shoe portions are positioned within the center of the shoe unit.

7. A joint according to claim 1, characterized in that the first and second flanges are substantially circular.

8. A joint according to claim 1, characterized in that the contact plane between the flanges coincide with the reference plane or that the contact plane is arranged at an angle to the reference plane.

9. A clamp band system for releasably connecting a first space craft element to a second space craft element;

characterized in that the clamp band system comprises a tensioning and releasing means, first shoe portions and second shoe portions, according to claim 1, wherein the first shoe portions are formed with a first lower surface of revolution and a first upper surface of revolution, and the second shoe portions being formed with a second lower surface of revolution and a second upper surface of revolution.

10. A clamp band system according to claim 9, characterized in that the first lower surface of revolution has a first angle and the first upper surface of revolution has a second angle, the second lower surface of revolution has a third angle and the second upper surface of revolution has a fourth angle, where the first angle and the second angle are larger than the third angle and the fourth angle, and where the angles are related to a plane that is corresponding to the reference plane during use.

11. A clamp band system according to claim 10, characterized in that the third angle and the fourth angle are both zero degrees.

12. Joint according to any one of claim 2, characterized in that the first shoe portion provides a constant pressure to the first and second flanges during connection.

13. A joint according to any one of claim 2, characterized in that the first shoe portions and the second shoe portions are positioned next to each other such that every second shoe portion being first shoe portions and second shoe portions respectively.

14. A joint according to any one of claim 2, characterized in that the first and second shoe portions are positioned within one shoe unit.

15. A joint according to any one of claim 3, characterized in that the first shoe portions and the second shoe portions are positioned next to each other such that every second shoe portion being first shoe portions and second shoe portions respectively.

16. A joint according to any one of claim 3, characterized in that the first and second shoe portions are positioned within one shoe unit.

17. A joint according to claim 2, characterized in that the first and second flanges are substantially circular.

18. A joint according to claim 2, characterized in that the contact plane between the flanges coincide with the reference plane or that the contact plane is arranged at an angle to the reference plane.

19. A joint according to claim 3, characterized in that the first and second flanges are substantially circular.

20. A joint according to claim 3, characterized in that the contact plane between the flanges coincide with the reference plane or that the contact plane is arranged at an angle to the reference plane.

* * * * *